(12) United States Patent
Izumi et al.

(10) Patent No.: US 8,825,316 B2
(45) Date of Patent: Sep. 2, 2014

(54) HYBRID-TYPE CONSTRUCTION MACHINE

(75) Inventors: Shiho Izumi, Hitachinaka (JP); Manabu Edamura, Kasumigaura (JP); Kouichi Shibata, Kasumigaura (JP); Manabu Sugiura, Tsuchiura (JP); Takatoshi Ooki, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/000,241

(22) PCT Filed: Feb. 27, 2012

(86) PCT No.: PCT/JP2012/054814
§ 371 (c)(1),
(2), (4) Date: Aug. 19, 2013

(87) PCT Pub. No.: WO2012/118027
PCT Pub. Date: Sep. 7, 2012

(65) Prior Publication Data
US 2013/0325269 A1    Dec. 5, 2013

(30) Foreign Application Priority Data

Mar. 1, 2011    (JP) ................................ 2011-044251

(51) Int. Cl.
```
G06F 7/70     (2006.01)
H02P 29/02    (2006.01)
E02F 9/20     (2006.01)
E02F 9/12     (2006.01)
E02F 9/22     (2006.01)
```
(52) U.S. Cl.
CPC ............ *E02F 9/2025* (2013.01); *H02P 29/024* (2013.01); *E02F 9/2095* (2013.01); *E02F 9/128* (2013.01); *E02F 9/2217* (2013.01); *H02P 29/026* (2013.01); *E02F 9/2091* (2013.01)
USPC ......................................................... 701/50

(58) Field of Classification Search
None
See application file for complete search history.

(56) References Cited

U.S. PATENT DOCUMENTS

2010/0097037 A1 *  4/2010  Morinaga et al. ............... 322/14
2013/0103272 A1 *  4/2013  Lee et al. ......................... 701/50

FOREIGN PATENT DOCUMENTS

| JP | 2005-237178 | 9/2005 |
| JP | 2008-63888  | 3/2008 |
| JP | 2011-36111  | 2/2011 |

*Primary Examiner* — Thomas Tarcza
*Assistant Examiner* — Adam Alharbi
(74) *Attorney, Agent, or Firm* — Antonelli, Terry, Stout & Kraus, LLP.

(57) ABSTRACT

A hybrid-type construction machine is provided which permits swing operation without a sense of awkwardness compared with conventional construction machines and which allows the amount of stored electricity in an electrical storage device to be controlled within an appropriate range of use in consideration of the service life of the electrical storage device without enlarging its capacity.

The hybrid-type construction machine includes an electric motor and a hydraulic motor for driving a swing structure, an electrical storage device, and a controller for controlling charging and discharging of the electrical storage device. The controller includes a storage unit which stores a discharge command region to be set in accordance with the swing speed of the swing structure with regard to the amount of stored electricity in the electrical storage device, and a computing unit which, if the amount of stored electricity in the electrical storage device reaches the discharge command region stored in the storage unit, computes an additional drive torque command value for increasing the amount of powering of the electric motor in accordance with the amount of stored electricity in the electrical storage device, the computing unit further outputting the additional drive torque command value to the electric motor to drive the swing structure.

5 Claims, 7 Drawing Sheets

HYBRID-TYPE CONSTRUCTION MACHINE

TECHNICAL FIELD

The present invention relates to a hybrid-type construction machine having a swing structure such as a hydraulic excavator. More particularly, the invention relates to a hybrid-type construction machine having a swing structure equipped with an electric motor and an electrical storage device for driving the swing structure.

BACKGROUND ART

In the past, the construction machines having a swing structure such as a hydraulic excavator were dominated by those equipped with an engine to drive a hydraulic pump delivering a hydraulic pressure for rotating a hydraulic motor that in turn drives the swing structure acting as an inertia field. In recent years, hybrid-type construction machines have been proposed which have the swing structure driven by both an electric motor and a hydraulic motor, the electric motor being powered by electrical energy from an electrical storage device, thereby helping to improve engine fuel efficiency, lower noise level, and cut down on the amount of exhaust fumes (see Patent Document 1). The construction machine described in Patent Document 1 includes not only an electric motor for swing purposes but also another electric motor for generating and supplying electrical energy to the electrical storage device when the level of stored electricity in the electrical storage device is lowered.

Patent Document 1 discloses a technique involving torque command means as control means for the hybrid-type construction machine, the torque command means commanding the torque to be in effect during drive control of the electric motor in connection with the pressure difference between the in-side and the out-side of the hydraulic motor for swing drive purposes. Also, Patent Document 1 discloses a technique whereby the ratio of the torque of the hydraulic motor to that of the electric motor during acceleration driving, and the ratio of the torque of the hydraulic motor to that of the electric motor during deceleration driving are determined using the pressure difference between the in-side and the out-side of the hydraulic motor as a parameter (e.g., paragraph 0060). Patent Document 1 explains that these techniques permit successive smooth drive control of the swing structure as an inertial field and enable the energy stemming from braking to be effectively charged into the electrical storage device as electrical energy (e.g., paragraphs 0033 and 0034).

PRIOR ART LITERATURE

Patent Documents

Patent Document 1: JP,A 2008-63888

SUMMARY OF INVENTION

Problems to be Solved by the Invention

Meanwhile, the techniques described in Patent Document 1 are supposed to use the pressure difference between the in-side and the out-side of the hydraulic motor as the parameter in changing the torque taken on by the hydraulic motor and the torque undertaken by the electric motor during both acceleration and deceleration driving, thereby altering the ratios of the shared torque therebetween so as to obtain the torque necessary for driving the swing structure. However, it is very difficult in practice to freely change the output of the hydraulic motor while the machine is in operation. In such a structure, there is a difference between the electrical energy consumed by the electric motor during acceleration driving and the electrical energy generated by the electric motor during deceleration driving, so that the amount of stored electricity in the electrical storage device fluctuates. Needless to say, if the amount of stored electricity in the electrical storage device declines, the electric motor cannot be driven by demanded torque. If the amount of stored electricity in the electrical storage device becomes excessive, the service life of that device may be adversely affected; in a worst-case scenario, the electrical storage device may fail.

However, with regard to charging/discharging management of the electrical storage device, Patent Document 1 only explains that when the amount of stored electricity in the electrical storage device is lower than a predetermined value, a power-generating motor is driven so as to feed the electrical energy thus generated to the electrical storage device (paragraphs 0053 and 0055); there is no mention of energy management taking into consideration the adverse effects of the overcharge of the electrical storage device on its service life.

On the other hand, the drive torque shared by the hydraulic motor and electric motor for this type of construction machine needs to be suitably controlled so that an operator familiar with the operation of conventional construction machines having a swing structure driven by the hydraulic motor alone may operate the machine without a sense of awkwardness. In this case, the energy consumed by the electric motor during driving (power running) and the energy generated by that motor during braking (regeneration) are discharged from and charged into the electrical storage device connected to the electric motor. Since the capacity of the electrical storage device is limited, it is especially important to suitably manage the amount of stored electricity in the electrical storage device (i.e., energy management).

Incidentally, if there is provided a large-capacity electrical storage device, it may be possible to dispense with above-mentioned energy management. One disadvantage of this scheme, however, is that as the capacity of the electrical storage device is increased, so is the space in which to install that device on the construction machine, which in turn can raise the cost of the construction machine.

Furthermore, even if energy management is carried out in such a manner that the amount of stored electricity in the electrical storage device is held within a range of use deemed appropriate in consideration of service life, the amount of stored electricity in the electrical storage device may exceed the appropriate range depending on the difference between the electrical energy consumed by the electric motor during acceleration driving and the electrical energy generated by that motor during deceleration driving, since work patterns are not fixed for the machine. One way of circumventing this problem is by enlarging the capacity of the electrical storage device, which is problematic from the point of view of cost and installation space as mentioned above.

The present invention has been made in view of the above-mentioned problems of the prior art, and an object of the invention is to provide a hybrid-type construction machine which permits swing operation without a sense of awkwardness compared with conventional construction machines and which allows the amount of stored electricity in an electrical storage device to be controlled within an appropriate range of use in consideration of the service life of the electrical storage device without enlarging its capacity.

Means for Solving the Problems

In achieving the above object, according to a first aspect of the present invention, there is provided a hybrid-type construction machine including an engine, a hydraulic pump driven by the engine, a swing structure, an electric motor and a hydraulic motor for driving the swing structure, a swing control lever operated by an operator to drive the swing structure, an electrical storage device for storing electrical energy to be supplied to the electric motor, and a controller to which is input a signal reflecting the amount and direction of operation of the swing control lever and which controls charging and discharging of the electrical storage device; the controller includes a storage unit which stores a discharge command region to be set in accordance with the swing speed of the swing structure with regard to the amount of stored electricity in the electrical storage device, and a computing unit which, if the amount of stored electricity in the electrical storage device reaches the discharge command region stored in the storage unit, computes an additional drive torque command value for increasing the amount of powering of the electric motor in accordance with the amount of stored electricity in the electrical storage device, the computing unit further outputting the additional drive torque command value to the electric motor to drive the swing structure.

According to a second aspect of the present invention, there is provided a hybrid-type construction machine including an engine, a hydraulic pump driven by the engine, a swing structure, an electric motor and a hydraulic motor for driving the swing structure, a swing control lever operated by an operator to drive the swing structure, an electrical storage device for storing electrical energy to be supplied to the electric motor, and a controller to which is input a signal reflecting the amount and direction of operation of the swing control lever and which controls charging and discharging of the electrical storage device; the controller includes a storage unit which stores a charge command region to be set in accordance with the swing speed of the swing structure with regard to the amount of stored electricity in the electrical storage device, and a computing unit which, if the amount of stored electricity in the electrical storage device reaches the charge command region stored in the storage unit, computes an additional drive torque command value for increasing the amount of regeneration of the electric motor in accordance with the amount of stored electricity in the electrical storage device, the computing unit further outputting the additional drive torque command value to the electric motor to brake the swing structure.

According to a third aspect of the present invention, there is provided the hybrid-type construction machine as described in the first aspect, in which the controller further includes a storage unit which further stores a normal use region as an optimal range in which to use the electrical storage device with regard to the amount of stored electricity in the electrical storage device, and a computing unit which, if the amount of stored electricity in the electrical storage device falls within the normal use region stored in the storage unit, computes a torque command value for driving and braking the swing structure in accordance with the amount and direction of operation of the swing control lever, the computing unit further outputting the torque command value to the electric motor.

According to a fourth aspect of the present invention, there is provided the hybrid-type construction machine as described in the first aspect, in which the controller further includes hydraulic/electric complex control means which computes an electric motor torque command value based on the additional drive torque command value and on the torque command value for driving and braking the swing structure in accordance with the amount and direction of operation of the swing control lever, and which outputs the electric motor torque command to the electric motor.

According to a fifth aspect of the present invention, there is provided the hybrid-type construction machine as described in the first aspect, in which the additional drive torque command value for the electric motor computed in accordance with the amount of stored electricity in the electrical storage device varies in accordance with the amount of stored electricity given the same conditions under which the swing structure is driven or braked, and in which the amplitude of the varying torque is kept within 20 percent or less of a standardized total torque value obtained by adding up the torque of the electric motor given the same conditions under which the swing structure is driven or braked and the torque of the hydraulic motor.

Effects of Invention

According to the present invention, it is possible to perform drive control of the swing electric motor using an additional torque command signal obtained by adding the torque of the swing electric motor to a standardized value. This makes it possible to maintain the amount of stored electricity in the electrical storage device within an appropriate range that takes the service life of the electrical storage device into consideration. As a result, there is no need to enlarge the capacity of the electrical storage device or to ensure the space in which to install the device. At the same time, swing operation can be performed with the same ease of use as that of conventional construction machines.

MODE FOR CARRYING OUT THE INVENTION

Figure 1:
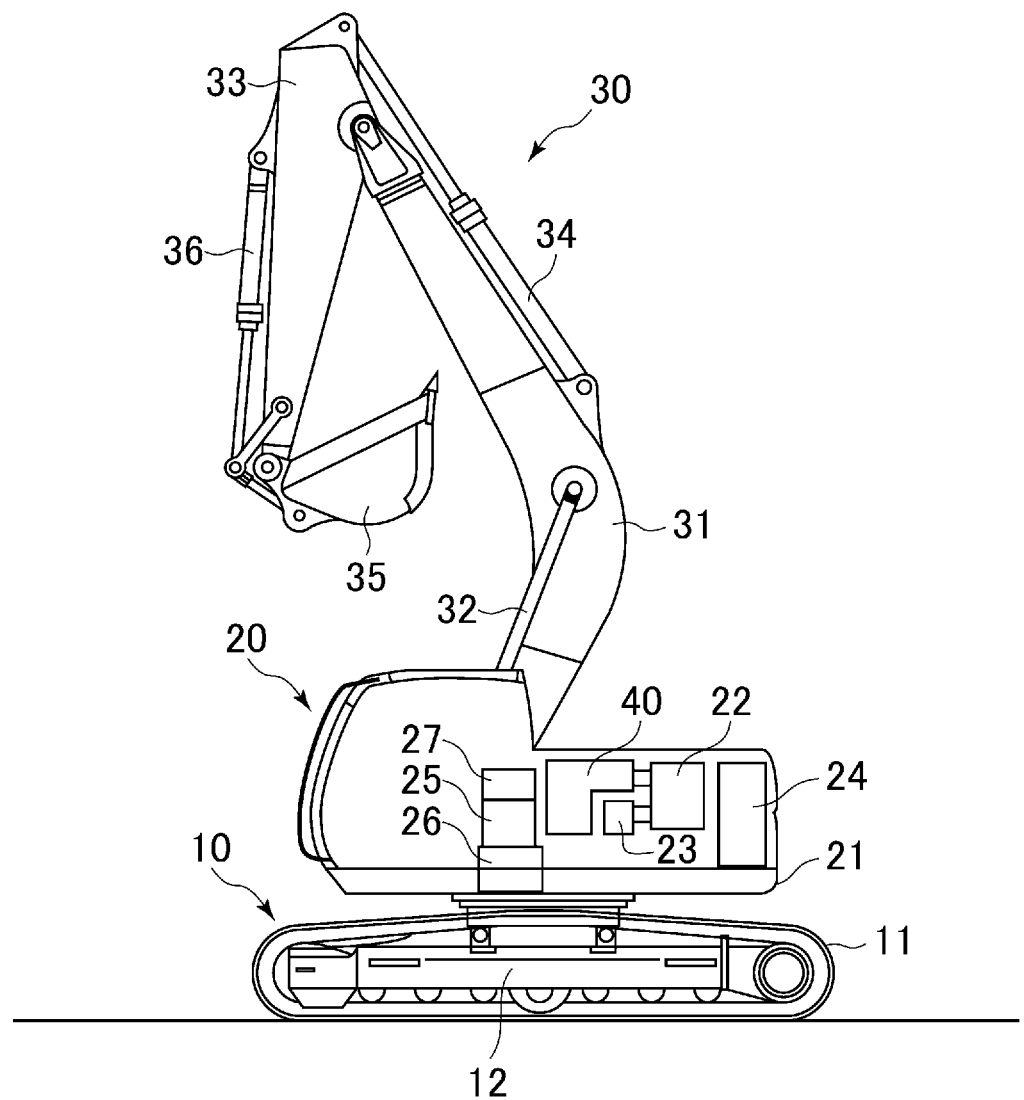
FIG. 1 is a side view of a hydraulic excavator to which a hybrid-type construction machine as one embodiment of the present invention is applied.
Figure 2:
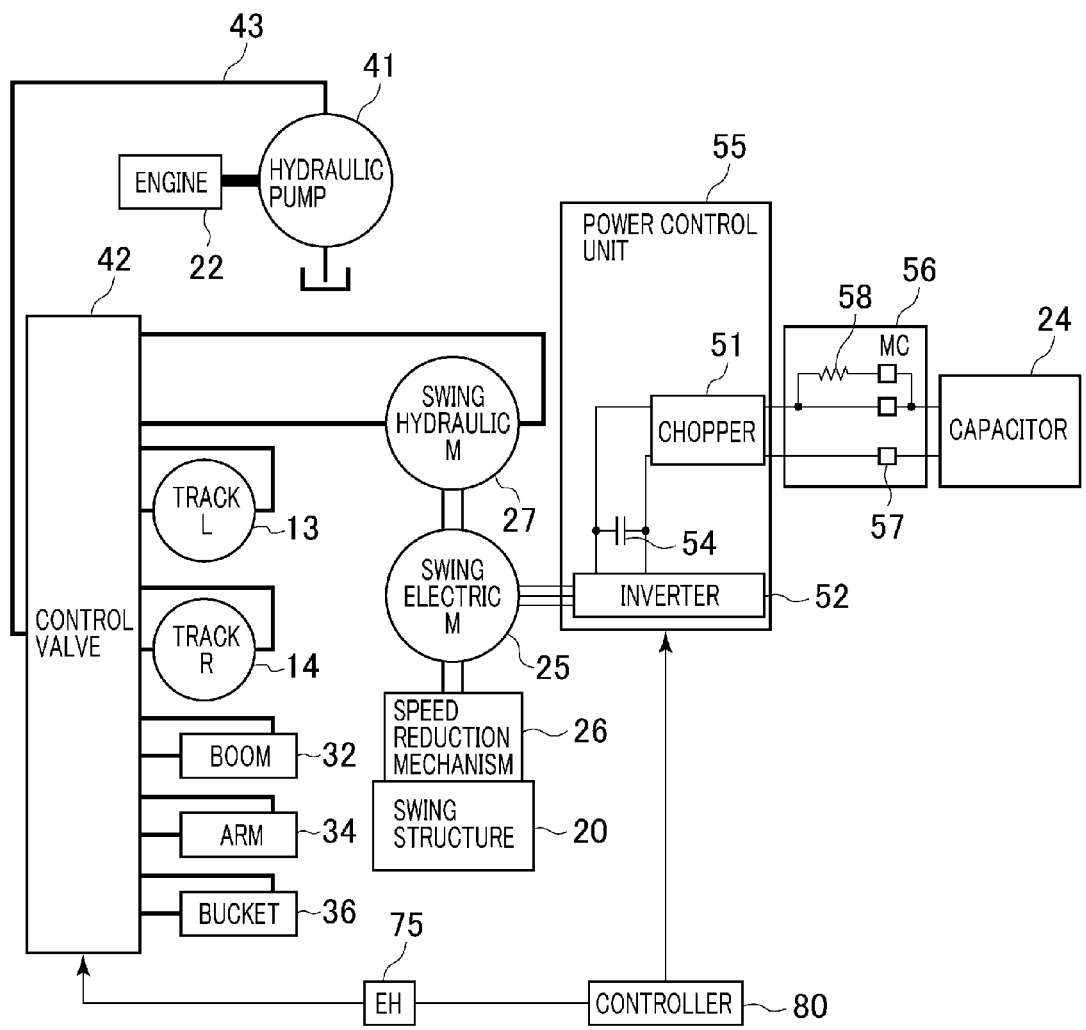
FIG. 2 is a system configuration diagram of electric/hydraulic equipment constituting part of the hybrid-type construction machine as one embodiment of the present invention.
Figure 3:
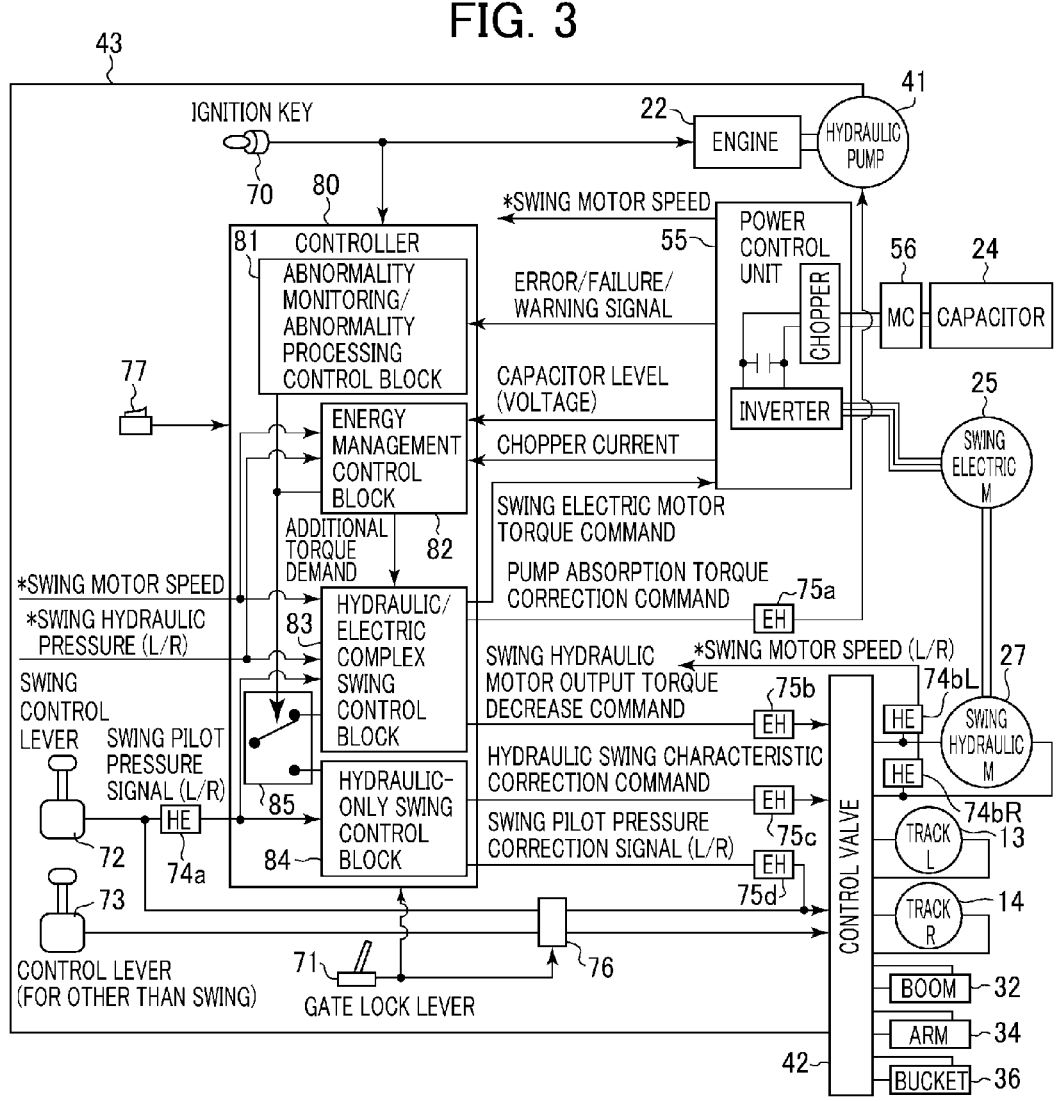
FIG. 3 is a system configuration and control block diagram of the hybrid-type construction machine as one embodiment of the present invention.
Figure 4:
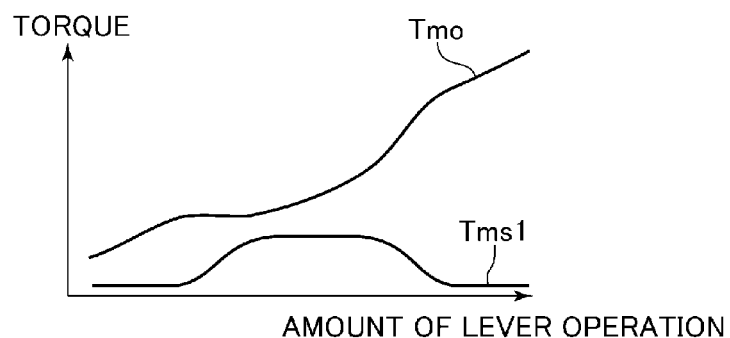
FIG. 4 is a characteristic diagram showing the relationship between the amount of lever operation and the drive torque of a hydraulic motor and an electric motor of the hybrid-type construction machine as one embodiment of the present invention.

Some embodiments of the present invention are explained below in reference to the accompanying drawings using a hydraulic excavator as a typical construction machine. It should be noted that the present invention can be applied to all construction machines (including work machines) equipped with a swing structure and that the application of this invention is not limited to the hydraulic excavator. For example, the invention can also be applied to a crane vehicle equipped with a swing structure and other construction machines. FIG. 1 is a side view of a hydraulic excavator to which a hybrid-type construction machine as one embodiment of the present invention is applied; FIG. 2 is a system configuration diagram of electric/hydraulic equipment constituting part of the hybrid-type construction machine as one embodiment of the present invention; FIG. 3 is a system configuration and control block diagram of the hybrid-type construction machine as one embodiment of the present invention, and FIG. 4 is a characteristic diagram showing the relationship between the amount of lever operation and the drive torque of a hydraulic motor and an electric motor of the hybrid-type construction machine as one embodiment of the present invention.

In FIG. 1, the hydraulic excavator includes a track structure 10, and a swing structure 20 and an excavator mechanism 30 mounted on the track structure 10 in swingable fashion.

The track structure 10 is made up of a symmetrical pair of crawlers 11 and a symmetrical pair of crawler frames 12 (shown only one each in FIG. 1), a pair of track hydraulic motors 13 and 14 for performing drive control of the crawlers 11 independently of one another, and a speed reduction mechanism working in conjunction with the track hydraulic motors 13 and 14.

The swing structure 20 is made up of a swing frame 21, an engine 22 mounted on the swing frame 21 as a prime mover, a swing electric motor 25 and a swing hydraulic motor 27, a capacitor 24 acting as an electrical storage device connected to the swing electric motor 25, and a speed reduction mechanism 26 for decelerating the revolutions of the swing electric motor 25 and swing hydraulic motor 27. The driving power of the swing electric motor 25 and swing hydraulic motor 27 is transmitted via the speed reduction mechanism 26 to drive the swing structure 20 (swing frame 21) in swinging fashion relative to the track structure 10.

Also, an excavator mechanism (front device) 30 is mounted on the swing structure 20. The excavator mechanism 30 is made up of a boom 31, a boom cylinder 32 for driving the boom 31, an arm 33 mounted axially rotatably near the tip of the boom 31, an arm cylinder 34 for driving the arm 33, a bucket 35 mounted axially rotatably on the tip of the arm 33, and a bucket cylinder 36 for driving the bucket 35.

Further mounted on the swing frame 21 of the swing structure 20 is a hydraulic system 40 for driving hydraulic actuators such as the above-mentioned track hydraulic motors 13 and 14, swing hydraulic motor 27, boom cylinder 32, arm cylinder 34, and bucket cylinder 36. The hydraulic system 40 includes a hydraulic pump 41 (FIG. 2) acting as a hydraulic operating fluid source for generating hydraulic pressure and a control valve 42 (FIG. 2) for performing drive control of the actuators. The hydraulic pump 41 is driven by the engine 22.

Below is an overall explanation of the system configuration of the electric/hydraulic equipment on the hydraulic excavator. As shown in FIG. 2, the driving power of the engine 22 is transmitted to the hydraulic pump 41. The control valve 42 controls the flow and direction of the hydraulic operating fluid supplied to the swing hydraulic motor 27 in accordance with a swing operation command (hydraulic pilot signal) coming from a swing control lever device 72 (see FIG. 3). The control valve 42 further controls the flow and direction of the hydraulic operating fluid supplied to the boom cylinder 32, arm cylinder 34, bucket cylinder 36, and track hydraulic motors 13 and 14 in accordance with an operation command (hydraulic pilot signal) coming from an other-than-swing control lever device 73 (see FIG. 3).

Incidentally, the control valve 42 of this embodiment holds its bleed-off opening area wider than ordinary machines when the control input of the swing control lever is set in an intermediate range (i.e., between neutral and maximum) so that the drive torque of the swing hydraulic motor 27 (torque in the direction of driving the swing structure 20) with the control input in the intermediate range becomes lower than ordinary machines. Also, the control valve 42 holds its meter-out opening area larger than ordinary machines when the control input of the swing control lever device 72 is set in the intermediate range so that the braking torque of the swing hydraulic motor 27 (torque in the direction of braking the upper swing structure 20) with the control input in the intermediate range becomes lower than ordinary machines.

The swing control system, as shown in FIG. 2, includes a controller 80 that outputs control signals reflecting commands from the control lever device 72 (see FIG. 3) to the above-mentioned control valve 42 and to a power control unit 55 controlling the charging and discharging of the capacitor 24. The power control unit 55 includes a chopper 51, an inverter 52, and a smoothing capacitor 54. A main contactor 56 is provided including a main relay 57 and a rush current prevention circuit 58.

DC power from the capacitor 24 is boosted by the chopper 51 to a predetermined bus voltage before being input to the inverter 52 to drive the swing electric motor 25. The smoothing capacitor 54 is provided to stabilize the bus voltage. The rotation axis of the swing electric motor 25 and that of the swing hydraulic motor 27 are coupled, whereby the swing structure 20 is driven via the speed reduction mechanism 26. The capacitor 24 is charged or discharged depending on drive status of the swing electric motor 25 (i.e., whether the motor is powering or regenerating).

The devices, control means, and control signals necessary for performing swing control according to this invention are explained below in more detail in reference to FIG. 3.

The hydraulic excavator is equipped with an ignition key 70 for starting the engine 22, and a gate lock lever device 71 for turning on a pilot pressure cutoff valve 76 to deactivate the hydraulic system at the time of stopping work. The hydraulic excavator is also furnished with the above-mentioned controller 80 and with hydraulic/electric conversion devices 74a, 74bL and 74bR; electric/hydraulic conversion devices 75a, 75b, 75c and 75d, and a hydraulic-only swing mode setting switch 77 associated with the input and output to and from the controller 80. These components make up a swing control system. For example, the hydraulic/electric conversion devices 74a, 74bL and 74bR may be a pressure sensor each, and the electric/hydraulic conversion devices 75a, 75b, 75c and 75d may be a solenoid proportional pressure reducing valve each.

As shown in FIG. 3, the controller 80 is made up of an abnormality monitoring/abnormality processing control block (means) 81, an energy management control block (means) 82, a hydraulic/electric complex swing control block (means) 83, a hydraulic-only swing control block (means) 84, and switching means 85 for switching between the hydraulic/electric complex swing control block (means) 83 and hydraulic-only swing control block (means) 84.

The abnormality monitoring/abnormality processing control block 81 admits error/failure/warning signals output from the power control unit 55. The energy management control block 82 admits a capacitor level signal, a chopper current signal and a swing motor speed output from the power control unit 55, and a swing hydraulic pressure which is output from the control valve 42 and which is converted to an electric signal by the pressure-to-electric signal conversion devices (e.g., pressure sensors) 74bL and 74bR. The energy management control block 82 outputs an additional torque demand to the hydraulic/electric complex swing control block 83 and a demand for switchover to hydraulic-only swing mode to the switching means 85

The hydraulic/electric complex swing control block 83 admits a swing pilot pressure signal which is output from the swing control lever 72 and which is converted to an electric signal by the hydraulic-to-electric signal conversion device (e.g., pressure sensor) 74a, a swing motor speed output from the power control unit 55, and a swing hydraulic pressure which is output from the control valve 42 and which is converted to an electric signal by the pressure-to-electric signal conversion devices (e.g., pressure sensors) 74bL and 74bR. The hydraulic/electric complex swing control block 83 outputs a swing electric motor torque command to the power control unit 55, a pump absorption torque correction command to the hydraulic pump 41, and a swing hydraulic motor output torque decrease command to the control valve 42. Incidentally, the pump absorption torque correction command and swing hydraulic motor output torque decrease command are converted to hydraulic pilot signals by the electric-to-pressure signal conversion devices (e.g., solenoid proportional valves) 75a and 75b before being input to the hydraulic pump 41 and control valve 42.

The hydraulic-only swing control block 84 admits the swing pilot pressure signal which is output from the swing control lever 72 and which is converted town electric signal by the hydraulic-to-electric signal conversion device 74a, and outputs a hydraulic swing characteristic correction command and a swing pilot pressure correction signal to the control valve 42 via the electric-to-pressure signal conversion devices 75c and 75d. The switching means 85, as will be discussed later, may be switched automatically by the controller 80 in accordance with drive status of the swing structure 20 and with the amount of stored electricity in the capacitor 24, or switched manually using the hydraulic-only swing mode setting switch 77 attached to the controller 80.

When the system as a whole is free of abnormality and in a state in which the swing electric motor 25 is ready to be driven, the hydraulic/electric complex swing control block 83 performs swing control of the swing structure 20. That is, when an operator manipulates the swing control lever 72, a hydraulic pilot signal reflecting the direction and amount of lever operation is generated and input to the control valve 42. At the same time, the swing pilot pressure signal converted to an electric signal is also input to the controller 80 via the hydraulic-to-electric signal conversion device 74a. This causes the control valve for the swing hydraulic motor 27 to open and drive the swing hydraulic motor 27. Concurrently, the swing electric motor 25 is driven, supplied with power from the capacitor 24.

As explained above, during driving, the control valve 42 of this embodiment holds its bleed-off opening area wider than ordinary machines when the control input of the swing control lever 72 is in the intermediate range so as to lower the drive torque; during braking, the control valve 42 also holds its meter-out opening area wider than ordinary machines when the control input of the swing control lever 72 is in the intermediate range in order to lower the braking torque. Thus the drive torque of the swing hydraulic motor 27 in the hydraulic system 40 of this embodiment is lower than that in ordinary hydraulic machines. The controller 80 computes a swing electric motor torque command sufficient to drive the swing electric motor 25 with an amount of drive torque making up for the decrease in the drive torque of the swing hydraulic motor 27. FIG. 4 schematically shows drive torque Tms1 of the swing electric motor 25 and drive torque Tmo of the swing hydraulic motor 27, the two kinds of torque reflecting the amount of operation of the swing control lever 72.

The hydraulic/electric complex swing control block 83 supplements the drive torque Tms1 of the swing electric motor 25 and the drive torque Tmo of the swing hydraulic motor 27 with the additional torque demanded by the energy management control block 82, before outputting the swing electric motor torque command to the power control unit 55. The additional torque is added to the drive torque Tms1 of the swing electric motor 25. A method for computing the swing electric motor torque command supplemented with the additional torque will be explained later.

The amount of stored electricity in the capacitor 24 fluctuates in accordance with the difference between the electric energy consumed by the swing electric motor 25 during acceleration and the electric energy regenerated thereby during deceleration. The energy management control block 82 controls the amount of stored electricity in the capacitor 24 within an appropriate range. By adjusting the torque to be added to the swing electric motor 25, the energy management control block 82 performs control to maintain the amount of stored electricity in the capacitor 24 within the appropriate range.

Figure 5:
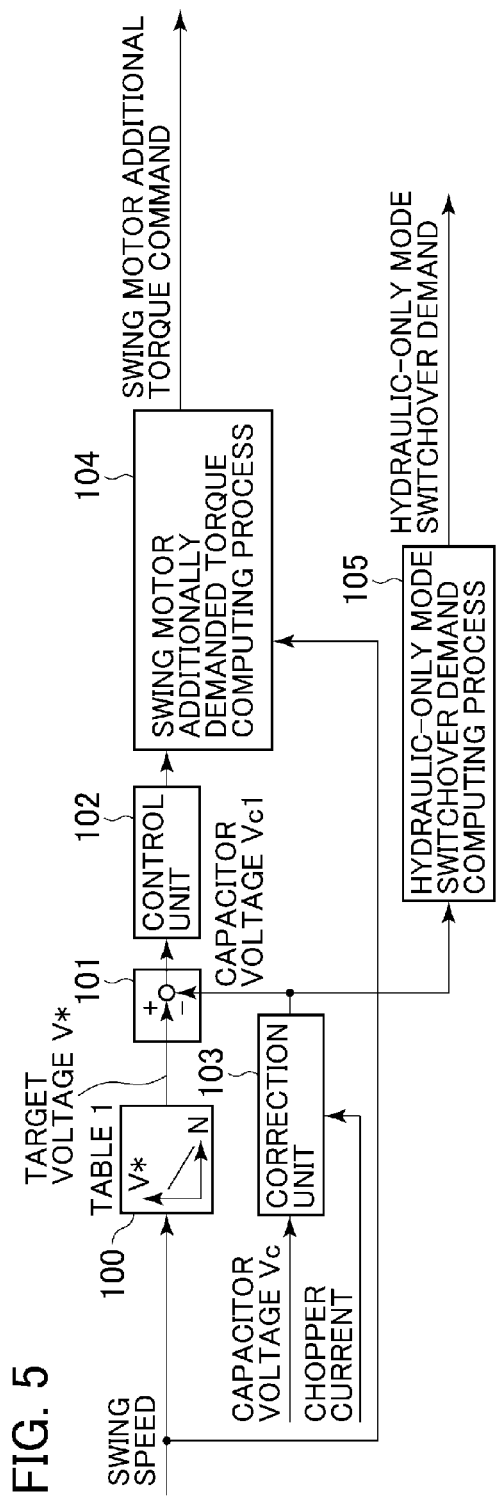
FIG. 5 is a block diagram of an energy management control means constituting part of the hybrid-type construction machine as one embodiment of the present invention.
Figure 6:
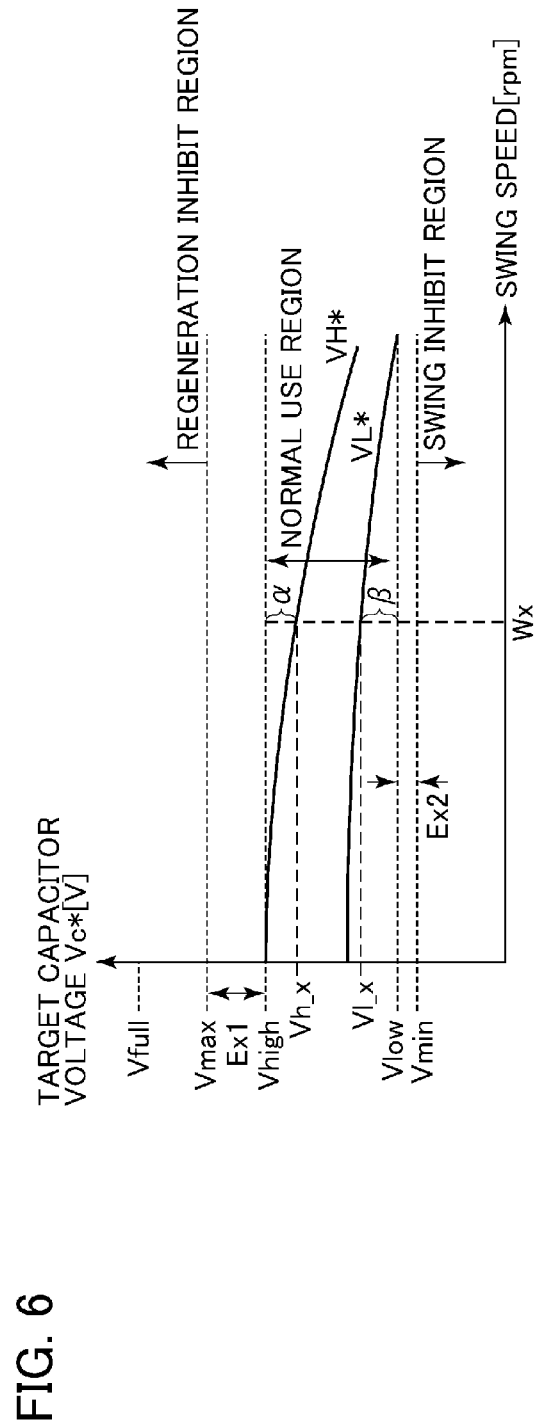
FIG. 6 is a characteristic diagram explaining a normal use region, a regeneration inhibit region and a swing inhibit region, as well as a discharge command and a charge command to be stored into a controller constituting part of the hybrid-type construction machine as one embodiment of the present invention.

Explained next in reference to FIGS. 5 and 6 is detailed processing performed by the energy management control block 82 of the controller 80. FIG. 5 is a block diagram of an energy management control means constituting part of the hybrid-type construction machine as one embodiment of this invention, and FIG. 6 is a characteristic diagram explaining a normal use region, a regeneration inhibit region and a swing inhibit region, as well as a discharge command and a charge command to be stored into a controller constituting part of the hybrid-type construction machine as one embodiment of this invention. Of the reference characters in FIGS. 5 and 6, those already used in FIGS. 1 to 4 designate like or corresponding parts of which detailed explanations are omitted hereunder.

The energy management control block 82 shown in FIG. 5 performs a process in which, if the amount of stored electricity in the capacitor 24 cannot be maintained within the appropriate range through the charging and discharging alone of the capacitor 24 using the drive torque or regenerative torque of the swing electric motor 25 computed by the hydraulic/electric complex swing control block 83, the drive torque or regenerative torque of the swing electric motor 25 is supplemented with an amount of torque that will not give the operator a sense of awkwardness in swing operation so as to adjust the amount of stored electricity in the capacitor 24.

With this embodiment, a capacitor voltage Vc is controlled by computing the additional torque of the swing electric motor 25 with regard to a target capacitor voltage Vc*, whereby the swing electric motor 25 is operated for power running or for regeneration. The target capacitor voltage Vc* is set to be dependent on the kinetic energy of the upper swing structure 20. Here, as shown in FIG. 6, the target voltage Vc* of the capacitor 24 is set beforehand in terms of a charge command VL* and a discharge command VH* that are stored in the storage unit as a table reflecting swing speeds. For example, if kinetic energy is getting larger during powered swing operation, i.e., if swing speed is getting higher, then regenerative energy to be gained from the eventual regenerative operation is expected to be larger. In this case, the target capacitor voltage Vc* is set to be lower to keep the amount of stored electricity smaller in the capacitor in preparation for the increased regenerative energy. Likewise, if kinetic energy is getting smaller during regenerative operation, i.e., if swing speed is getting lower, the target capacitor voltage Vc* is set to be higher to raise the amount of stored electricity in the capacitor in preparation for the eventual powered operation.

FIG. 6 shows the content of a table 1 defined by the function generator of a control block 100 indicated in FIG. 5. In FIG. 6, Vmax stands for the capacitor voltage defining the regeneration inhibit region, Vhigh for the capacitor voltage defining the maximum voltage of the normal use region, Vlow for the capacitor voltage defining the minimum voltage of the normal use region, and Vmin for the capacitor voltage defining the swing inhibit region.

Where the target capacitor voltage Vc* is set as described above, the computing unit of the energy management control block 82 performs control to compute the torque of the swing electric motor 25 in a manner supplemented with a predetermined maximum output (on the powering side) if the capacitor voltage Vc is higher than (Vh_x+α), with the swing speed at Wx in FIG. 6. If the capacitor voltage Vc is lower than (Vl_x−β), with the swing speed at Wx, the torque of the swing electric motor 25 is controlled to be supplemented with a predetermined maximum output (on the regeneration side). And if the capacitor voltage Vc is in the range defined as Vl_x≤Vc≤Vh_x, the torque of the swing electric motor 25 is not supplemented (additional torque is 0). The electric energy reflecting the powering and regenerating operations of the swing electric motor 25 is then charged into and discharged from the capacitor 24.

In FIG. 6, the target capacitor voltages VL* and VH* representing the charge command and discharge command for the capacitor 24 should preferably be set in such a manner that the normal use region of the capacitor 24 is effectively utilized. That is, when the voltage range in which the capacitor 24 is used appropriately from the viewpoint of service life is established as the normal use region, electric energy is effectively utilized for improved efficiency as long as the capacitor voltage Vc ranges all the way from the minimum voltage Vmin to the maximum voltage Vmax. Thus energy efficiency is made higher the closer the capacitor voltage is to Vmax during charging with regenerative energy and the closer the capacitor voltage is to Vmin during discharging for powering operation.

In practice, however, the target capacitor voltages VL* and VH* are set with margins of a regenerative energy allowance value Ex1 and a powering energy allowance value Ex2 in view of such cases as the capacitor 24 being continuously charged by regeneration from swing work on slopes or the like, or the capacitor 24 being continuously discharged during pressing work or the like. According to this system, as will be discussed later, it is possible to switch to hydraulic motor-only mode even if the capacitor level exceeds a predetermined range. This makes it possible to set the regenerative energy allowance value Ex1 and powering energy allowing value Ex2 to be small, which in turn reduces the size of the capacitor 24. Incidentally, the voltage range equal to or higher than the maximum voltage Vmax belongs to the regeneration inhibit region where the electric energy regenerated by the swing electric motor 25 is inhibited from charging the capacitor, and the voltage range equal to or below the minimum voltage Vmin belongs to the swing inhibit region where the swing electric motor 25 is inhibited from powering the swing operation. The controller 80 stores the normal use region, regeneration inhibit region, and swing inhibit region shown in FIG. 6.

In FIG. 5, the function generator of a control block 100 admits the swing motor speed output from the power control unit 55, and outputs the above-mentioned target capacitor voltage Vc*. Also, a control block 103 is a correction computing unit that performs correction computation of the capacitor voltage. Specifically, the control block 103 admits a detected voltage value Vc of the capacitor 24 and a detected chopper current output from the power control unit 55, and outputs a capacitor voltage corrected for the amount of the voltage drop attributable to an internal resistance value. A control block 101 is a deviation computing unit that admits the output of the control block 100 and that of the control block 103 and outputs deviations from these outputs to a control block 102. A control computing unit of the control block 102 multiplies the input value by a predetermined proportional gain to compute the output to be charged into or discharged from the capacitor 24. A control block 104 is a computing unit that performs the process of computing additional torque demanded of the swing motor. As such, the control block 104 admits the output of the control block 102 and the swing motor speed output from the power control unit 55 to compute a swing motor additional torque command. Specifically, the control block 104 divides the output computed by the control block 102 by the revolution speed of the swing electric motor 25 for conversion into the swing motor additional torque command. This swing motor additional torque command is output to the hydraulic/electric complex swing control block 83.

Figure 7:
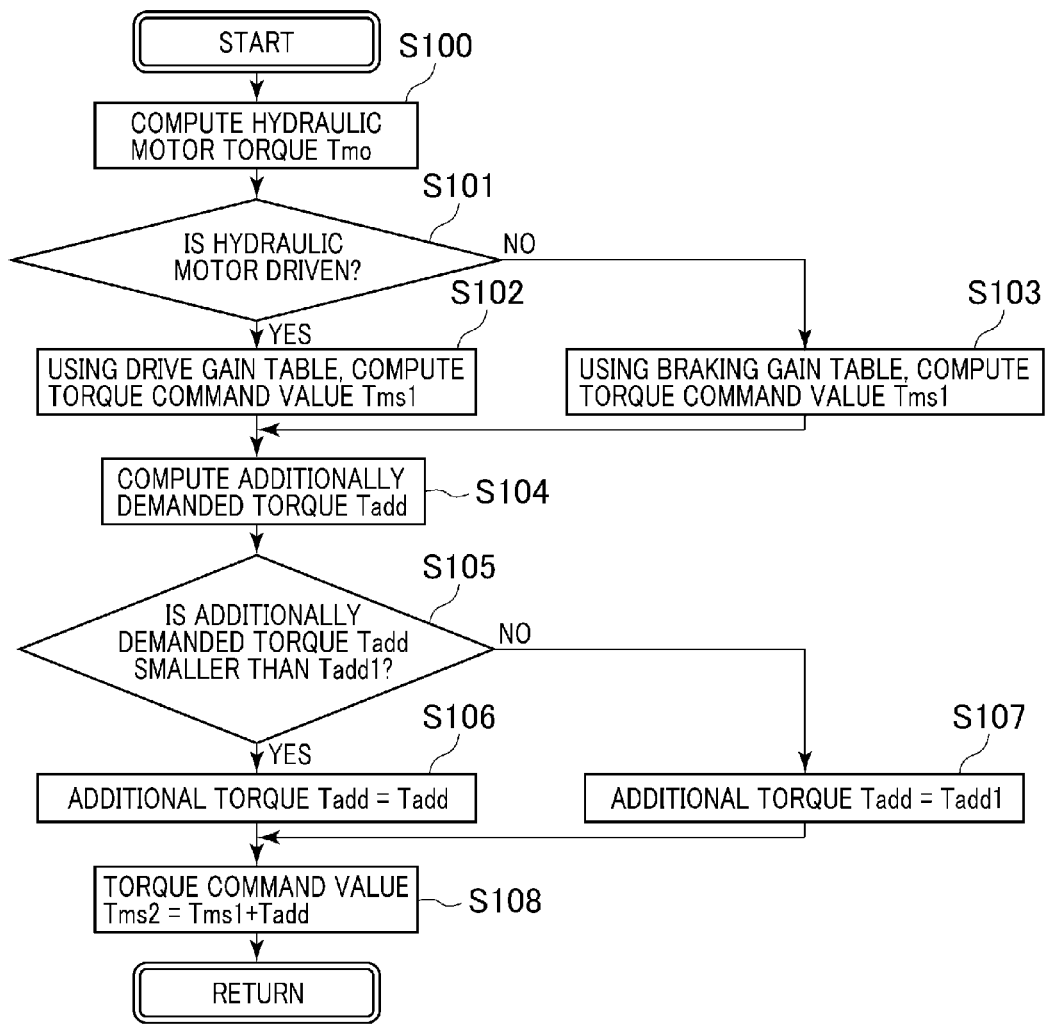
FIG. 7 is a flowchart showing a process flow for computing the torque command value of a swing electric motor in the hybrid-type construction machine as one embodiment of the present invention.
Figure 8:
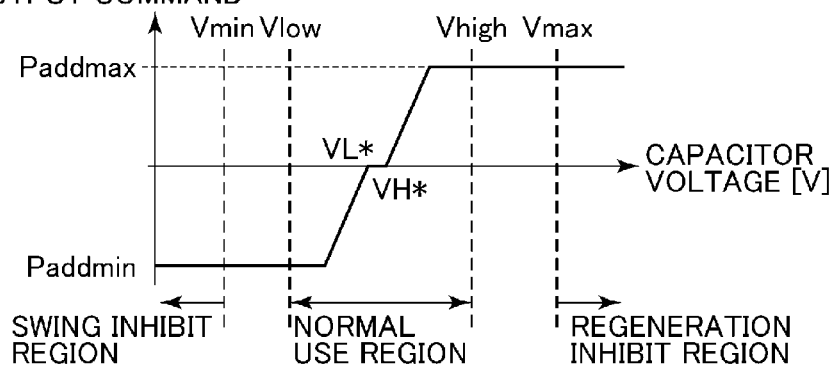
FIG. 8 is a characteristic diagram showing the relations of an additionally demanded output command value to the capacitor voltage in the hybrid-type construction machine as one embodiment of the present invention.

Explained next in reference to FIGS. 7 and 8 is a detailed process of computing the additional torque demanded of the swing motor. FIG. 7 is a flowchart showing a process flow for computing the torque command value of the swing electric motor in the hybrid-type construction machine as one embodiment of this invention, and FIG. 8 is a characteristic diagram showing the relations of an additionally demanded output command value to the capacitor voltage in the hybrid-type construction machine as one embodiment of this invention. Of the reference characters in FIGS. 7 and 8, those already used in FIGS. 1 through 6 designate like or corresponding parts of which detailed explanations are omitted hereunder.

First, in step (S100), the hydraulic motor torque Tmo of the swing hydraulic motor 27 is computed. Specifically, the hydraulic motor torque Tmo is calculated by taking in swing hydraulic pressure signals from the pressure-to-electric signal conversion devices 74bL and 74bR attached to two ports (for input and output of hydraulic operating fluid) of the swing hydraulic motor 27, and by computing the difference between the two signals.

Next, in step (S101), it is determined whether the swing hydraulic motor 27 is being driven or braked. Specifically, the determination is made by comparatively computing the amounts of changes in the detected swing motor revolution speed and in the detected swing hydraulic pressure. If the swing hydraulic motor 27 is determined to be driven, the result of this determination is affirmative (Yes) and step (S102) is reached; if the swing hydraulic motor 27 is determined to be braked, the result of this determination is negative (No) and step (S103) is reached.

In step (S102), the electric motor torque command value Tms1 for driving is computed. Specifically, the gain is computed using a drive gain table established in keeping with the amounts of swing operation. The drive gain thus computed is multiplied by the hydraulic motor torque Tmo calculated in step (S100) to obtain the electric motor torque command value Tms1.

In step (S103), the electric motor torque command value Tms1 for braking is computed. Specifically, the gain is computed using a braking gain table established in keeping with the amounts of swing operation. The braking gain thus computed is multiplied by the hydraulic motor torque Tmo calculated in step (S100) to obtain the electric motor torque command value Tms1. These electric motor torque command values Tms1 are set to be substantially the same as those of the torque for driving the swing structure using only the hydraulic motor on ordinary machines. Thus as shown in FIG. 4, the computed electric motor torque command value Tms1 is set to become large when the amount of operation of the swing control lever is in the intermediate range.

In step (S104), additionally demanded torque Tadd is computed. Specifically, the charging/discharging power to be input and output in accordance with the capacitor voltage Vc indicative of the charged state of the capacitor 24 is calculated. The charging/discharging power is divided by the swing speed to compute the additionally demanded torque Tadd. FIG. 8 shows a table by which an additionally demanded output command is set with regard to the capacitor voltage Vc. During swing drive operation (powering operation), the additionally demanded output is set so that when the capacitor voltage is equal to or higher than VH*, discharging is performed with dischargeable power Paddmax[kW] or less. During swing braking operation (regenerative operation), the additionally demanded output is set so that when the capacitor voltage is equal to or lower than VL*, charging is performed with chargeable power Paddmin[kW] or less.

Next, in step (S105), it is determined whether or not the additionally demanded torque Tadd computed in step (S104) is smaller than a predetermined upper limit Tadd1.

If it is determined in step (S105) that the additionally demanded torque Tadd is smaller than the predetermined upper limit Tadd1, the result of this determination is affirmative (Yes) and step (S106) is reached. If it is determined that the additionally demanded torque Tadd is equal to or larger than the upper limit Tadd1, the result of this determination is negative (No) and step (S107) is reached.

In step (S106), the value computed in step (S104) is set to be the additionally demanded torque Tadd.

In step (S107), the predetermined upper limit Tadd1 is set to be the additionally demanded torque Tadd. The upper limit Tadd1 is set within such a range that there is no difference between the sense of swing felt by the operator when the swing electric motor 25 is driven with the sum of the additionally demanded torque Tadd and the drive torque Tms1 for the swing electric motor 25 on the one hand, and the sense of swing felt by the operator when the swing electric motor 25 is driven with the drive torque Tms1 not supplemented with the additionally demanded torque Tadd for the swing electric motor 25 on the other hand. Experiments conducted by the inventors revealed that most operators do not experience any sense of awkwardness in swing operation when the drive torque Tms1 of the swing electric motor 25 is supplemented with up to 20 percent of torque. With this embodiment, the upper limit Tadd1 of the additionally demanded torque is set to be a value obtained by multiplying a hydraulic motor torque command value Tms1 computed in step (S102) or (S103) by a gain K1. That is, Tadd1=K1·Tms1, where K1 is 0.2.

In step (S108), an electric motor torque command value Tms2 is computed based on the additional torque demand Tadd calculated in step (S106) or (S107). Specifically, the additionally demanded torque Tadd is added to the above-mentioned hydraulic motor torque command value Tms1 to compute the electric motor torque command value Tms2 (=Tms1+Tadd).

The electric motor torque command value Tms2 thus computed is output, as shown in FIG. 3, from the hydraulic/electric complex swing control block 83 of the controller 80 to the power control unit 55.

Figure 9:
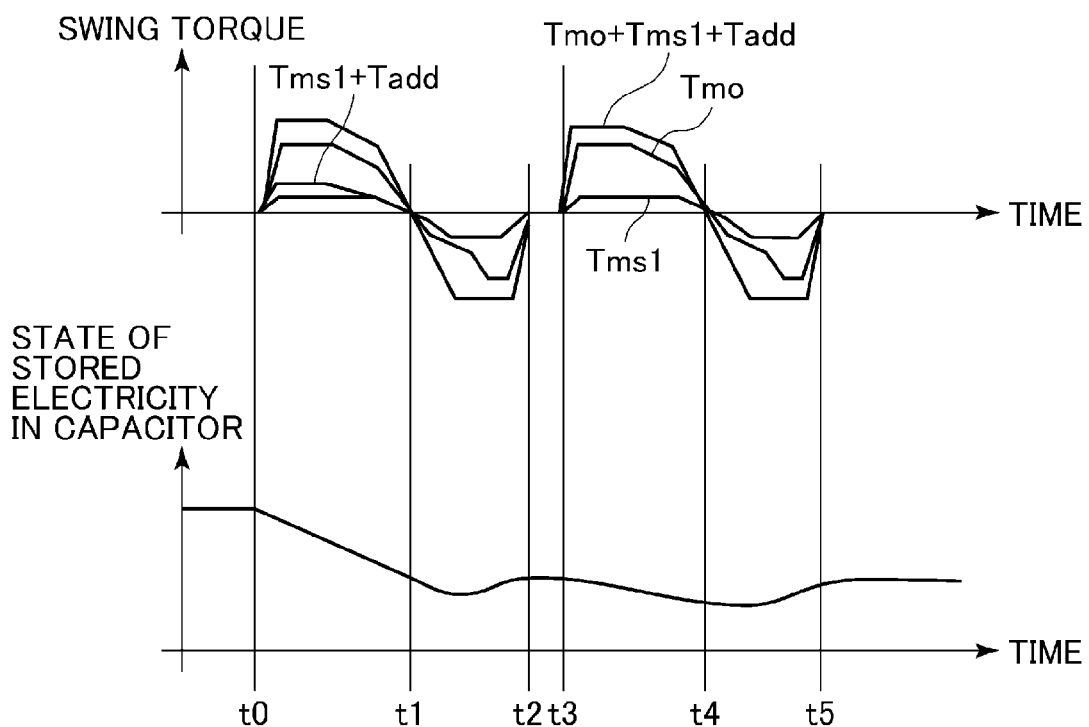
FIG. 9 is a characteristic diagram showing changes in hydraulic motor torque, swing electric motor torque, and additional torque between the start and the stop of a swing structure on the hybrid-type construction machine as one embodiment of the present invention.

Explained next in reference to FIG. 9 are the workings of the hybrid-type construction machine as one embodiment of the present invention. FIG. 9 is a characteristic diagram showing changes in hydraulic motor torque, swing electric motor torque, and additional torque between the start and the stop of the swing structure on the hybrid-type construction machine as one embodiment of the present invention.

FIG. 9 plots changes in the hydraulic motor torque Tmo, in the swing electric motor torque Tms1, and in the additional torque Tadd added to the swing electric motor torque Tms1 between the start and the stop of the swing structure 20. Explained here are the torque of the swing motor 25 and that of the swing motor 27 which vary with the state of stored electricity in the capacitor between time t0 and time t5. Reference characters (A) and (B) indicative of the amounts of lever operation show that the operator has performed as much swing operation as the amounts of lever operation represented by (A) and (B).

(1) At time t0 at which the operation of the swing control lever is started, the state of stored electricity in the capacitor is brought high so that the additional torque Tadd is enlarged. The torque to be ultimately output by the swing electric motor 25 (swing electric motor torque) is obtained by adding Tadd to the swing electric motor torque Tms1 serving as the reference (Tms1+Tadd).

(2) Between time t1 and time t2, the swing electric motor torque Tms1 regenerated by the swing electric motor 25 is output through a like process based on the lever operation.

(3) Next, at time t3 at which the swing operation (B) of the same amount of lever operation as (A) is started, the state of stored electricity in the capacity is within the normal range but stays relatively low. In this case, the reference swing electric motor torque Tms1 is ultimately output without being supplemented with additional torque.

(4) Given the above workings, the powering energy output during powering from time t0 to time t1 becomes larger than the powering energy output during powering from time t3 to time t4.

Under the control described above, it is easier to maintain the state of stored electricity in the capacity within an appropriate range, and it is possible to reduce as much as possible the switchover to hydraulic-only swing mode, to be discussed later. It is also possible to implement a system configuration in which the capacitor 24 is reduced in capacity. Furthermore, it is possible to use energy effectively and improve fuel efficiency without giving the operator a sense of awkwardness in operation.

Returning to FIG. 5, a control block 105 acting as a computing unit that performs a hydraulic-only mode switchover demand computing process. If the amount of stored electricity in the capacitor 24 does not fall within a predetermined range even after the torque of the swing electric motor 25 is supplemented, a switchover is made from hydraulic/electric complex swing mode to hydraulic-only mode in order to prevent the capacitor 24 from being charged or discharged as the swing electric motor is driven or braked. In FIG. 5, the computing unit of the control block 105 admits a corrected capacitor voltage output from the control block 103, and outputs a hydraulic-only mode switchover demand to the switching means 85 of the controller 80 shown in FIG. 3. The switchover to hydraulic-only mode is set to be made based on the state of stored electricity in the capacitor 24. When the amount of stored electricity is large, a regeneration inhibit flag is output in two stages; when the amount of stored electricity is small, a swing inhibit flag is output also in two stages.

Figure 10A:
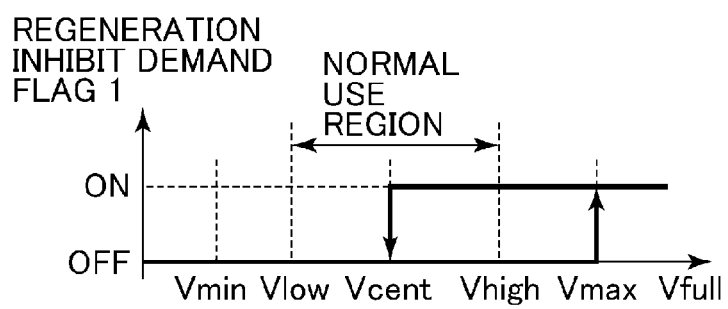
FIG. 10A is a characteristic diagram showing an example in which a hydraulic-only mode switchover demand is output (setting example of a regeneration inhibit flag) on the hybrid-type construction machine as one embodiment of the present invention.
Figure 10B:
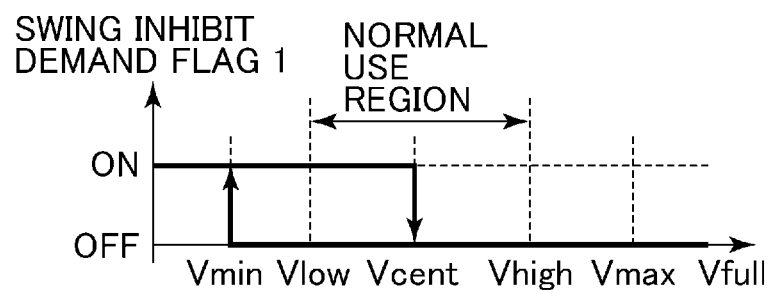
FIG. 10B is a characteristic diagram showing another example in which the hydraulic-only mode switchover demand is output (setting example of a swing inhibit flag) on the hybrid-type construction machine as one embodiment of the present invention.

Setting examples of the regeneration inhibit flag and swing inhibit flag are explained in reference to FIGS. 10A and 10B. FIG. 10A is a characteristic diagram showing an example in which a hydraulic-only mode switchover demand is output (setting example of the regeneration inhibit flag) on the hybrid-type construction machine as one embodiment of this invention, and FIG. 10B is a characteristic diagram showing another example in which the hydraulic-only mode switchover demand is output (setting example of the swing inhibit flag) on the hybrid-type construction machine as one embodiment of this invention. Of the reference characters in FIGS. 10A and 10B, those already used in FIGS. 1 through 9 designate like or corresponding parts of which detailed explanations are omitted hereunder.

In FIG. 10A, when the capacitor voltage has increased to reach the threshold value Vmax of the regeneration inhibit region, the regeneration inhibit demand flag is turned ON to make a switchover to hydraulic-only mode. Thereafter, when the capacitor voltage drops to a central value Vcent of the normal use region through e.g. self-discharge, the regeneration inhibit flag is turned OFF to cancel hydraulic-only mode.

In FIG. 10B, when the capacitor voltage declines to reach the threshold value Vmin of the swing inhibit region, the swing inhibit flag is turned ON to make a switchover to hydraulic-only mode. In this case, work can be continued in hydraulic-only mode. To enable hydraulic/electric complex control again requires charging the capacitor 24 so that the amount of stored electricity in the capacitor 24 will fall within a predetermined range. There may be two methods for performing this kind of charging. One method involves setting up a separate charging circuit that charges the capacitor from the outside, and another method involves providing work mode (charging mode) in which charging is made using the swing electric motor 25. Either of these methods may be utilized. The above-mentioned ON/OFF switching of the flags is made when swinging and operation are not carried out in order to reduce the sense of shock as much as possible during operation.

In addition to the control explained above in reference to FIGS. 10A and 10B, there may be adopted a control method for turning ON a second regeneration inhibit flag when a state is reached in which the capacitor voltage has attained a predetermined voltage value (e.g., Vfull) higher than the threshold value Vmax of the regeneration inhibit region. Since the state in which the capacitor voltage has reached Vfull is presumably one in which the capacitor 24 has developed an abnormality, the switchover from OFF to ON of the second regeneration inhibit flag is immediately made regardless of swing operation being carried out or not.

Also, the switchover from hydraulic/electric complex swing mode to hydraulic-only swing mode is made not only upon demand from the above-described energy management control block 82 but also when an abnormality has occurred in the electric system such as the power control unit 55, swing electric motor 25, and capacitor 24. In the latter case, the switchover from hydraulic/electric complex swing mode to hydraulic-only swing mode is carried out based on the determination made by the abnormality monitoring/abnormality processing control block 81.

The switchover between hydraulic/electric complex swing mode and hydraulic-only swing mode may incur a slight shock during operation typically due to valve switching operations performed on hydraulic circuits upon mode switchover. For this reason, if the nature of the error is not serious so that there is no urgency in switching the modes immediately, the switchover is made when neither swinging nor operation is performed or during idling with no operation carried out including by a front device. In case of abnormalities such as an inverter overcurrent which lead to system damage or incur serious troubles or a disaster, the electric system is immediately stopped and a switchover is made to hydraulic-only swing mode even during operation.

If the error signal has disappeared spontaneously or is cancelled by a suitable error handling process during hydraulic-only swing control, a return to hydraulic/electric complex swing mode is made when neither swinging nor operation is performed or during idling with no operation carried out including by the front device.

As described above, when the capacitor voltage has attained a predetermined regeneration inhibit value or a predetermined swing inhibit value, the drive mode of the upper swing structure 20 is switched from hydraulic/electric complex swing mode to hydraulic-only swing mode. This allows the upper swing structure 20 to be driven continuously, whereby enhanced workability is maintained.

According to the hybrid-type construction machine as one embodiment of the present invention, the torque of the swing electric motor 25 is controlled to be supplemented with regard to the reference value. This makes it possible to keep the amount of stored electricity in the capacitor 24 as the electrical storage device within an appropriate range in consideration of service life. As a result, a hybrid-type construction machine is provided which permits swing operation without a sense of awkwardness compared with conventional construction machines and which does not require enlarging the capacity of the capacitor 24 acting as the electrical storage device.

Also according to the hybrid-type construction machine as one embodiment of this invention, when the amount of stored electricity in the capacitor 24 as the electrical storage device has attained a predetermined regeneration inhibit value or a predetermined swing inhibit value, the swing structure 20 is stopped from being driven or braked by the swing electric motor 25, and a switchover is made to the method whereby the swing structure 20 is driven and braked using solely the swing hydraulic motor 27. This makes it possible continuously to perform work with the construction machine.

Incidentally, with this embodiment, the additionally demanded output command is set to supplement the capacity voltage for both driving and braking of the swing electric motor 25. However, this is not limitative of the present invention. Alternatively, the command may be set only for driving or for braking depending on the system configured.

The invention claimed is:

1. A hybrid-type construction machine comprising an engine (22), a hydraulic pump (41) driven by said engine (22), a swing structure (20), an electric motor (25) and a hydraulic motor (27) for driving said swing structure (20), a swing control lever (72) operated by an operator to drive said swing structure (20), an electrical storage device (24) for storing electrical energy to be supplied to said electric motor (25), and a controller (80) to which is input a signal reflecting the amount and direction of operation of said swing control lever (72) and which controls charging and discharging of said electrical storage device (24);

wherein said controller (80) includes a storage unit which stores a discharge command region to be set in accordance with the swing speed of said swing structure (20) with regard to the amount of stored electricity in said electrical storage device (24), and a computing unit which, if the amount of stored electricity in said electrical storage device (24) reaches said discharge command region stored in said storage unit, computes an additional drive torque command value for increasing the amount of powering of said electric motor (25) in accordance with the amount of stored electricity in said electrical storage device (24), said computing unit further outputting said additional drive torque command value to said electric motor (25) to drive said swing structure (20).

2. A hybrid-type construction machine comprising an engine (22), a hydraulic pump (41) driven by said engine (22), a swing structure (20), an electric motor (25) and a hydraulic motor (27) for driving said swing structure (20), a swing control lever (72) operated by an operator to drive said swing structure (20), an electrical storage device (24) for storing electrical energy to be supplied to said electric motor (25), and a controller (80) to which is input a signal reflecting the amount and direction of operation of said swing control lever (72) and which controls charging and discharging of said electrical storage device (24);

wherein said controller (80) includes a storage unit which stores a charge command region to be set in accordance with the swing speed of said swing structure (20) with regard to the amount of stored electricity in said electrical storage device (24), and a computing unit which, if the amount of stored electricity in said electrical storage device (24) reaches said charge command region stored in said storage unit, computes an additional drive torque command value for increasing the amount of regeneration of said electric motor (25) in accordance with the amount of stored electricity in said electrical storage device (24), said computing unit further outputting said additional drive torque command value to said electric motor (25) to brake said swing structure (20).

3. The hybrid-type construction machine according to claim 1, wherein said controller (80) further includes a storage unit which further stores a normal use region as an optimal range in which to use said electrical storage device (24) with regard to the amount of stored electricity in said electrical storage device (24), and a computing unit which, if the amount of stored electricity in said electrical storage device (24) falls within said normal use region stored in said storage unit, computes a torque command value for driving and braking said swing structure (20) in accordance with the amount and direction of operation of said swing control lever (72), said computing unit further outputting said torque command value to said electric motor (25).

4. The hybrid-type construction machine according to claim 1, wherein said controller (80) further includes hydraulic-electric complex control means which computes an electric motor torque command based on said additional drive torque command value and on the torque command value for driving and braking said swing structure (20) in accordance with the amount and direction of operation of said swing control lever (72), and which outputs said electric motor torque command to said electric motor (25).

5. The hybrid-type construction machine according to claim 1, wherein the additional drive torque command value for said electric motor (25) computed in accordance with the amount of stored electricity in said electrical storage device (24) varies in accordance with said amount of stored electricity given the same conditions under which said swing structure (20) is driven or braked, and the amplitude of the varying torque is kept within 20 percent or less of a standardized total torque value obtained by adding up the torque of said electric motor (25) given the same conditions under which said swing structure (20) is driven or braked and the torque of said hydraulic motor (27).

* * * * *